May 25, 1965
J. L. LAGASSE
3,185,606
PORTABLE PNEUMATIC TOOL
Filed Nov. 27, 1963
2 Sheets-Sheet 1
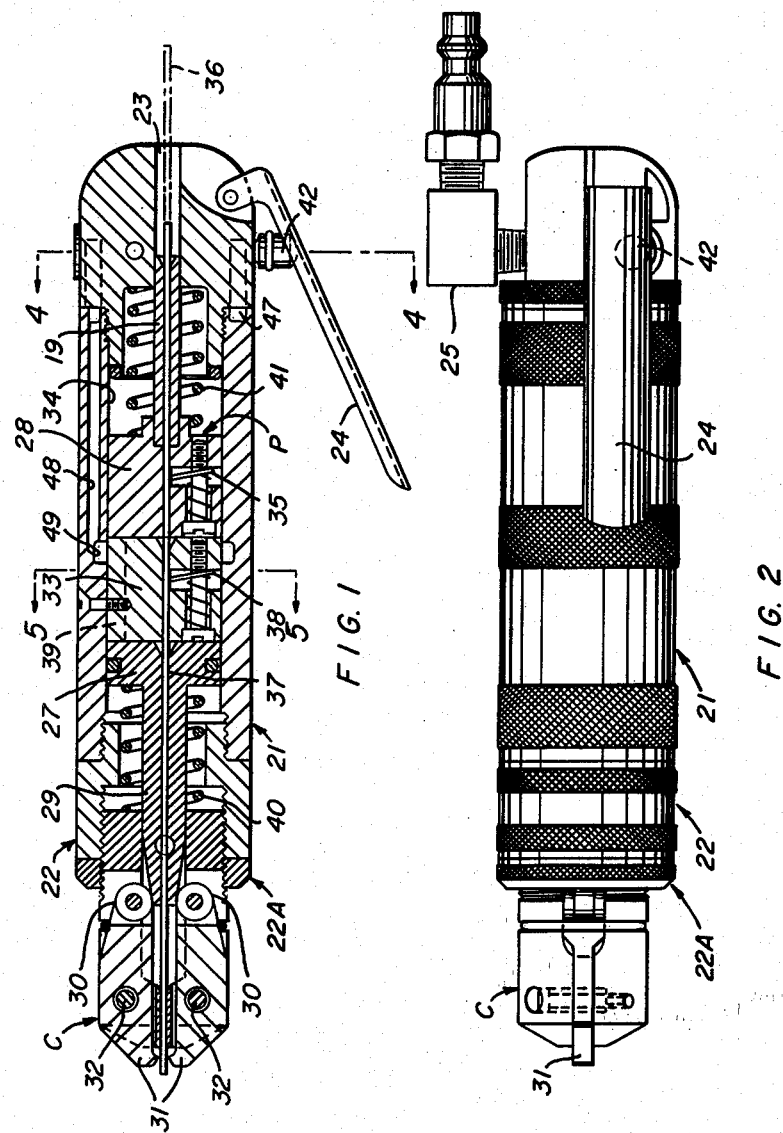
INVENTOR
JOSEPH L. LAGASSE
BY Smart & Biggar
ATTORNEYS.

May 25, 1965   J. L. LAGASSE   3,185,606
PORTABLE PNEUMATIC TOOL

Filed Nov. 27, 1963   2 Sheets-Sheet 2

INVENTOR
JOSEPH L. LAGASSE
BY Smart & Biggar
ATTORNEYS.

3,185,606
PORTABLE PNEUMATIC TOOL
Joseph L. Lagasse, Montreal, Quebec, Canada, assignor to Northern Electric Company Limited, Montreal, Quebec, Canada
Filed Nov. 27, 1963, Ser. No. 326,433
11 Claims. (Cl. 156—303.1)

This invention is directed to a method of inserting pins into a body and an apparatus for carrying out that method.

In accordance with this invention terminal pins for electrical apparatus are inserted in desired positions into a plastic mold from a reel of wire stock material and when located and inserted are cut to size from the stock, by the operation of a device particularly suited to carrying out the method.

The apparatus for carrying out the method comprises a wire feeding machine which is suitable for positioning in front of a mold and is adapted to feed a selected length of wire into the mold from a length of wire stock, and to sever the said length after its insertion in the mold.

Previous methods of assembling electrical components into apparatus mounted in plastic have employed the use of pre-formed wires or pins pushed into a soft plastic mold along with other components such as resistors and capacitors. An epoxy mixture or other suitable plastic is then poured into the mold where it binds all the components together to form a unit in a manner somewhat similar to a printed circuit. The assembly is then removed from the mold and wiring is attached to the projecting pins.

Use of pre-cut wire or pin inserts necessitated the employment of hand labor to position the wire or pins in their appropriate place in the soft plastic mold. This is an expensive and time consuming operation.

By forming the wire or pins from continuous wire stock, and by positioning the pins while connected to the parent stock, and cutting it to size when inserted in the mold, savings can be effected in material, time and labor.

The device herein set forth is suited for inserting the wire into the plastic mold and cuting it to length when in place.

The following is a description by way of example of certain embodiments of the invention, reference being had to the accompanying drawings in which:

FIGURE 1 is a longitudinal section through the wire placing device.

FIGURE 2 is a plan view in longitudinal arrangement.

The wire inserting tool comprises a hand held fluid operated gunlike device, having a pair of oppositely acting fluid operated pistons to feed and cut the wire, respectively.

Figure 1A:
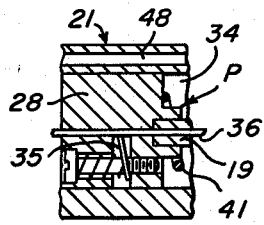
FIGURE 1A shows a component group from FIGURE 1.
Figure 3:
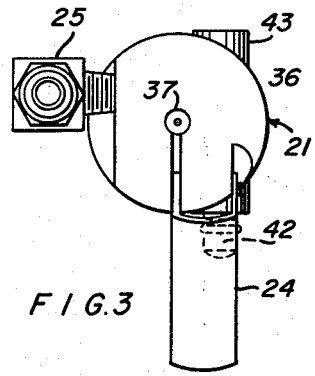
FIGURE 3 is an end view looking toward the handle end.

The tool comprises an elongated cylindrical body 21 suitable for holding in the hand, which receives wire 36 from a source of wire stock (not shown). Wire feeding means P (FIGURE 1) comprises a fluid actuated piston 28 which feeds wire (shown in phantom) through the device to the nose of the device which terminates with cutter C (FIGURE 1). The cylindrical body 21 has a nose piece 22 shown threadedly attached thereto with a wire-stock feed way 23, shown coincident with the main axis of the tool, and a cutter assembly C located on the nose of the tool, and retained by suitable cap means 22A. Piston 28 has a stock guide sleeve 19 moving in way 23.

Figure 4:
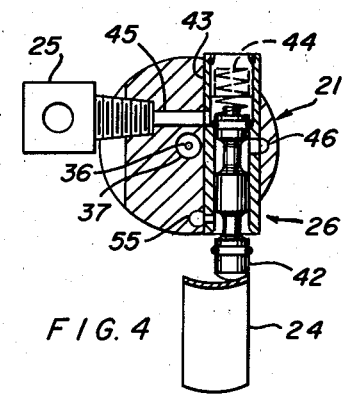
FIGURE 4 is a sectional view taken on line 4—4 of FIGURE 1.

A hand lever 24 controls admission of operating fluid, preferably compressed air, from the intake 25, by operating upon valve spool 42 of the control valve 26 (best illustrated in FIGURE 4) which controls the admission of air to the central zone of the tool, where it acts upon a fore piston 27 and after piston 28 (FIGURE 1).

The fore piston 27 is provided with a nose piece 29 which is tapered at its forefront to operate against rollers 30, the rollers 30 being part of the cutter assembly 24. Forward motion of piston 27 forces the tapered flanks of the portion 29 between the rollers 30, thereby pivoting the cutting jaws 31 about their pivots 32 in a wire cutting action.

An internal cylinder head 33 centrally located in the bore 34 of tool body 21 separates the forward and after pistons 27 and 28 from each other, and determines their initial positions longitudinally in the cylinder.

The after piston 28 is moved rearwardly by pressure air, at which time the wire gripper plate 35 slides freely along the wire stock 36, being carried by piston 28 on which it is mounted.

Forward movement of piston 28 results in positive feeding of the wire 36, the wire being secured relative to the piston 28 by the gripper plate 35.

Figure 5:
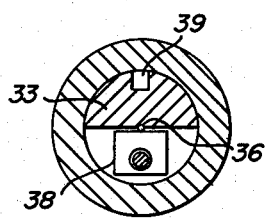
FIGURE 5 is a sectional view of a component of FIGURE 1, taken on line 5—5 of FIGURE 1.

Rearward withdrawal movement of wire 36 through the orifice 37 of piston head 33 when piston 28 moves rearwardly is prevented by gripper plate 38, suitably mounted in the cylinder head 33, as illustrated in FIGURES 1 and 5.

Pistons 27 and 28 move forwardly and rearwardly respectively when pressure air is admitted by the control valve 26 to the axial air passage 39 which traverses cylinder head 33.

The pistons 27 and 28 are maintained in their foremost and rearmost positions respectively by the continued admission of pressure air. Release of the pressure air permits return of the pistons under their respective springs 40 and 41.

The valve assembly 26 comprises a spool valve 42 slidably mounted in the bushing 43.

Depression of the hand lever 24 moves the spool valve 42 inwardly against its spring 44, whereby air from the fitting 25 flows to the intake 45 around the inner end of the spool to the axial passage 46 and thence by gallery 47 (shown in FIGURE 1) to the axial passage 48 which supplies the way 39 in the cylinder head 33, by means of the gallery 49. Release of the hand lever 24 shuts off the admission of air, by interposition of the spool's inner end between air inlet 45 and passage 46. The outward movement of spool 42 under action of spring 44 when the lever is released also serves to uncover passage 55 which is connected to the gallery 47, so that air within the device is released to atmosphere, as the pistons 27 and 28 are returned to their central position under the action of their respective springs 40 and 41.

The device operates in the following manner. Depression of hand lever 24 admits compressed air to the center of the device to drive the two pistons outwardly so that the forward piston 27 actuates the cutter 31 to cut the wire protruding therethrough while piston 28 is driven to its most rearward position.

Release of the lever 24 then cuts off the supply of compressed air and permits the release of air from in front of the two pistons, as before explained, so that the forward piston 27 is returned rearwardly, and piston 28 is spring propelled forwardly, carrying with it a fresh length of wire which feeds out through the mouth of the cutter 31 in a positive feeding manner.

The actual wire-receiving bore 23 which passes through all the main components should approximate fairly closely in section to the dimension of the wire to be used, or should incorporate suitable sealing means to prevent the undue escape of compressed air. The tool is suitable for inserting lengths of wire or various other shaped sections from uncut stock into suitable receiving materials, and employment for the insertion of fastening members such as nails is contemplated.

Particular use of the inserting tools in the manufacture of electrical components is as follows:

Depression of lever 24 results in the cutting-off of any wire protruding beyond the cutter end of the tool. By placing the tool adjacent the surface to be penetrated and releasing lever 24 a length of wire corresponding to the stroke of piston 28 is positively fed into the material, which cutter 31 abuts. Depression of lever 24 then results in the cutting off of that length of wire from the stock, after which the tool is repositioned for a further insertion cycle.

It can be seen that the form of the cutter 31 can be varied so that the protrusion of cut wire above the surface being penetrated can be controlled. Use of a suitable spacer attachment in advance of the nose of the device, for this purpose, is contemplated.

The length of wire fed on each operation of the device is controlled by the stroke distance provided in the device for the after piston 28.

It is contemplated that an axially extending stop screw be provided extending inwardly to contact the outer (rear) face of piston 28, which may adjustably limit the stroke of piston 28, being readily available to the exterior of the tool for adjustment purposes. Alternatively, provision for the axial repositioning of the cylinder head 33, using additional grubscrew recesses or other means well known in the art is contemplated.

It is further contemplated that wire for use with the tool is located adjacent the tool on a suitable spool or other source of supply, not shown.

While use of the tool to forcibly insert wire into the receiving surface has been taught, the sequence of control actions relating to the positioning of the tool can be changed, so that placing of the wire by insertion into the receiving surface can be effected by axial displacement of the device when the fed wire is protruding from the nose piece.

While the preferred embodiment is directed to a hand held tool, it is suited for adaption in other environments, such as a machine tool.

What I claim as my invention is:

1. A method of placing wire pins formed from continuous stock into a mold comprising the steps of securing and locating one end of said wire stock, positioning and aligning said stock relative to said mold, inserting said wire longitudinally into said mold, and severing said inserted wire from said stock while holding said wire in transverse and longitudinal stability relative to said mold, whereby a desired degree of insertion and a required amount of protrusion of said wire is achieved, while avoiding undesired deformation or damage to said mold and said wire.

2. A stock feeding means including body means for receiving said stock, stock feeding means including a first piston having an axial way for the passage of said stock, stock cutting means including a second piston operating a cutter and having an axial stock receiving way therethrough, said stock receiving ways being in axial alignment whereby said stock is maintained in an unbent form.

3. A wire feeding device comprising a housing, an axial way located centrally of said housing coincident with the longitudinal axis thereof, wire feeding means including a fluid operated piston having wire engaging means attached thereto, a return spring engaging one face of said piston, wire cutting means including at least one cutting jaw, cutter actuating means including a fluid actuated piston having a tapered nose portion for actuation of said at least one cutting jaw, said components being in general axial alignment relative to said housing and having a through way for the passage of wire stock.

4. A fluid actuated wire feeding device including a cylindrical body suitable for hand use and having a hand lever attached thereto, means for admitting pressurized fluid to said body, control valve means to control the access and egress of fluid to and from said tool, being acted upon by said lever, a pair of pistons in back-to-back relationship having a piston head interposed therebetween, passage means connecting said fluid control valve to said piston head, wire cutting means in actuating engagement with one of said pistons and wire feeding means in actuating engagement with the other of said pistons, whereby wire stock may be fed through said tool and cut to predetermined length.

5. A fluid actuated wire feeding device comprising an elongated housing having a cylindrical coaxially extending bore, a pair of fluid actuated pistons in said bore each having a coaxially aligned through way for the passage of wire stock, stock engaging means mounted on one of said pistons adjacent said through way, stock cutting means operated by the other of said pistons located adjacent said through way, spring means at the outer ends of each of said pistons to return them one towards the other, a fixed cylinder head interposed between said pistons having a through way aligned with the through ways of said pistons, means for admitting pressure fluid to the inner faces of said pistons by way of said cylinder head whereby said pistons are driven outwardly simultaneously, and means for releasing said pressure fluid from between the inner faces of said pistons, whereby said pistons are returned inwardly under the action of said spring means.

6. A stock feeding means; including body means for receiving stock; stock feeding means including a first piston slidably mounted in said body and having an axial way for the passage of said stock; stock cutting means including a second piston slidably mounted in said body and adapted to operate a stock cutter, and having an axial stock receiving way therethrough in axial alignment with the axial way of said first piston, spring means located at the remote ends of said pistons and adapted to move said pistons inwardly towards each other, and means to supply pressure fluid between said pistons to drive said pistons simultaneously outwardly against the resistance of said spring means whereby said stock cutter is operated, and to release said pressure fluid between said pistons to permit their return by said spring means whereby said first piston moves inwardly in a stock feeding motion.

7. Stock feeding means as claimed in claim 6 in which said feeding means includes a resiliently mounted stock gripping means carried by said first piston and grippingly engaging said stock when said first piston moves axially inwardly under the action of said spring means.

8. Stock feeding means as claimed in claim 7 in which said feeding means includes a stock gripper plate located within said body substantially axially immovable relative thereto and spring means urging said plate towards said axial way into stock engaging contact and adapted to permit movement of stock through said body in a forward feeding direction, and to prevent movement of stock rearwardly through said body in a reverse feeding direction by engagement of said plate against said stock.

9. Stock feeding means as claimed in claim 8 in which said gripper plate is mounted in a cylinder head located between said pistons.

10. Stock feeding means as claimed in claim 6 in which said stock cutting means includes at least one cutting member movable into cutting engagement with the stock when said second piston is driven axially outwardly on admission of pressure fluid between said pistons.

11. Stock feeding means as claimed in claim 6 in which said means for supplying pressure fluid includes a cylinder head interposed between said pistons and adapted to transmit pressure fluid to the inner faces of said pistons.

References Cited by the Examiner
UNITED STATES PATENTS
2,505,906  5/50  Merritt _____ 1—92

GRANVILLE Y. CUSTER, Jr., *Primary Examiner.*